US007003880B2

(12) United States Patent
Morita

(10) Patent No.: US 7,003,880 B2
(45) Date of Patent: Feb. 28, 2006

(54) INJECTOR NOZZLE AND METHOD OF MANUFACTURING INJECTOR NOZZLE

(75) Inventor: Hiromichi Morita, Kariya (JP)

(73) Assignee: Denso Corporation, Kariya (JP)

( * ) Notice: Subject to any disclaimer, the term of this patent is extended or adjusted under 35 U.S.C. 154(b) by 345 days.

(21) Appl. No.: 10/264,352

(22) Filed: Oct. 4, 2002

(65) Prior Publication Data

US 2003/0075622 A1     Apr. 24, 2003

(30) Foreign Application Priority Data

| Oct. 5, 2001 | (JP) | ............................ 2001-310624 |
| Oct. 5, 2001 | (JP) | ............................ 2001-310625 |
| Jul. 9, 2002 | (JP) | ............................ 2002-199898 |
| Jul. 9, 2002 | (JP) | ............................ 2002-199899 |

(51) Int. Cl.
*B21D 51/16* (2006.01)

(52) U.S. Cl. .................... 29/890.142; 29/90.7; 29/558; 72/53

(58) Field of Classification Search .............. 29/890.1, 29/890.142, 890.143, 90.7, 558; 72/53; 239/584, 239/585.1, 596, 533.2, 533.3
See application file for complete search history.

(56) References Cited

U.S. PATENT DOCUMENTS

| 2,737,831 | A | * | 3/1956 | Webb ............................ 72/327 |
| 3,695,091 | A | * | 10/1972 | Smith ............................ 72/53 |
| 5,062,573 | A | * | 11/1991 | Makimura ............. 239/533.12 |
| 5,075,968 | A | * | 12/1991 | Stalder et al. .......... 29/890.142 |
| 5,107,631 | A | * | 4/1992 | Wern .............................. 72/53 |
| 5,212,976 | A | * | 5/1993 | Company ....................... 72/53 |
| 5,226,331 | A | * | 7/1993 | Thompson et al. .......... 239/224 |
| 5,522,760 | A | * | 6/1996 | Patel et al. .................... 451/75 |
| 5,626,295 | A | * | 5/1997 | Heyse et al. ........... 29/890.142 |
| 5,895,313 | A | * | 4/1999 | Ikezaki et al. ................ 451/38 |
| 6,131,827 | A | * | 10/2000 | Kurita et al. ............. 239/533.2 |
| 6,189,356 | B1 | * | 2/2001 | Simeone et al. ............. 29/90.7 |
| 6,502,441 | B1 | * | 1/2003 | Suzuki et al. ................ 29/90.7 |
| 6,505,535 | B1 | * | 1/2003 | Kurita et al. .................. 83/34 |
| 6,678,955 | B1 | * | 1/2004 | Takeshita et al. ...... 29/890.142 |
| 6,694,789 | B1 | * | 2/2004 | Yamamoto et al. .......... 29/90.7 |
| 6,789,406 | B1 | * | 9/2004 | Spencer ................. 29/890.142 |
| 6,821,359 | B1 | * | 11/2004 | Osugi et al. ................ 148/200 |
| 2002/0020766 | A1 | * | 2/2002 | Kobayashi et al. ...... 239/533.2 |
| 2003/0165621 | A1 | * | 9/2003 | Farmer et al. .............. 427/331 |

FOREIGN PATENT DOCUMENTS

| JP | 3-194163 | * | 8/1991 |
| JP | 9-209876 |   | 8/1997 |

* cited by examiner

*Primary Examiner*—David P. Bryant
(74) *Attorney, Agent, or Firm*—Nixon & Vanderhye P.C.

(57) ABSTRACT

A fuel injector has an orifice member having an aperture for injecting atomizing and metering fuel. The orifice member is made of a plate material. The orifice member is machined to form the aperture. Then, the orifice member is processed by at least two shot blasting process in opposite directions to remove burrs and trim edges of the aperture. After the process, the orifice plate is inspected by measuring an actual flow rate of the aperture. Then, the orifice plate is processed by a shot blasting process again in accordance with the measured flow rate and a target flow rate.

10 Claims, 13 Drawing Sheets

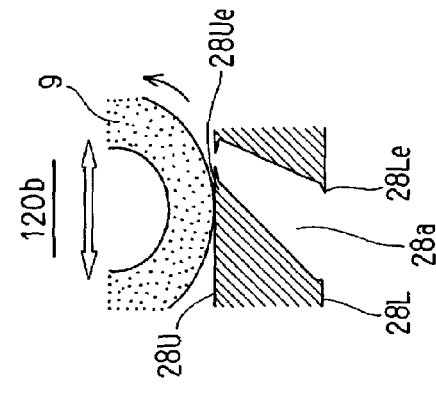
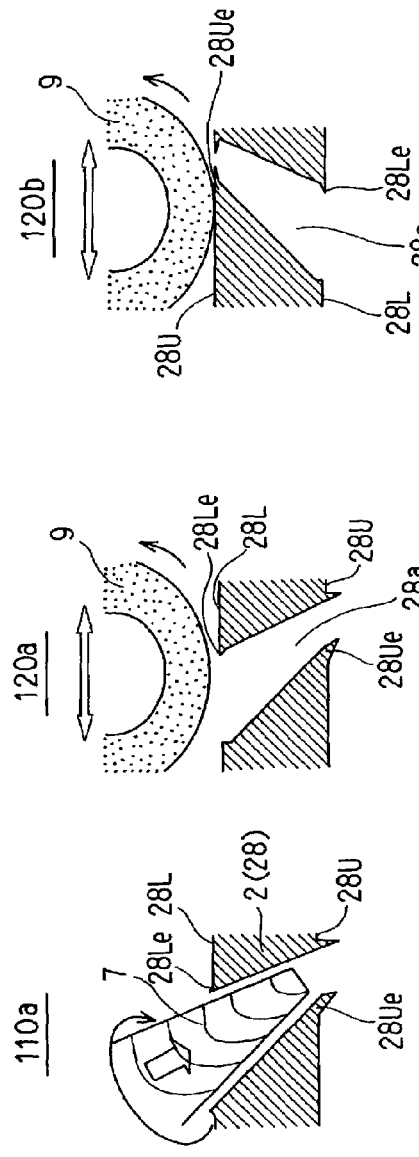
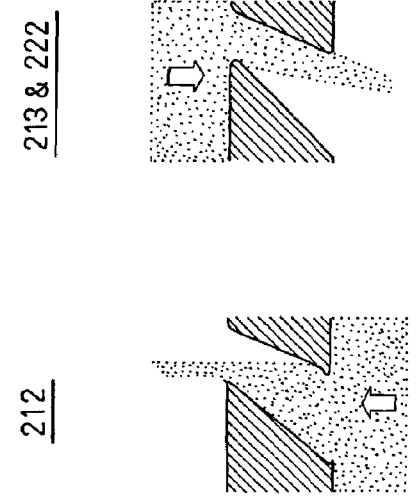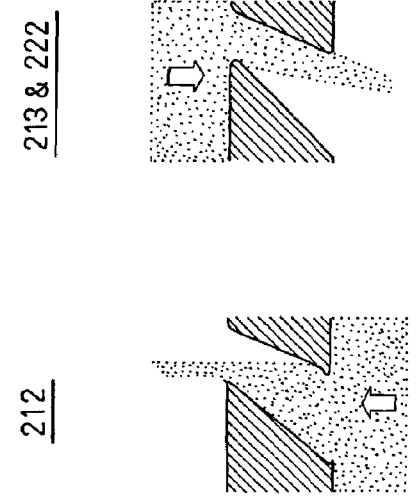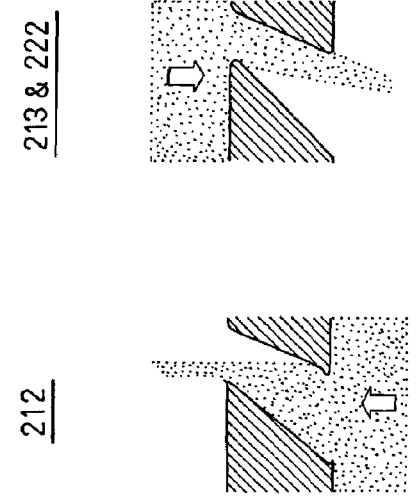
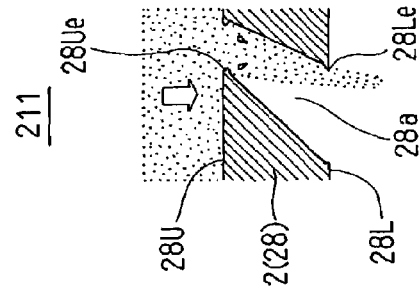

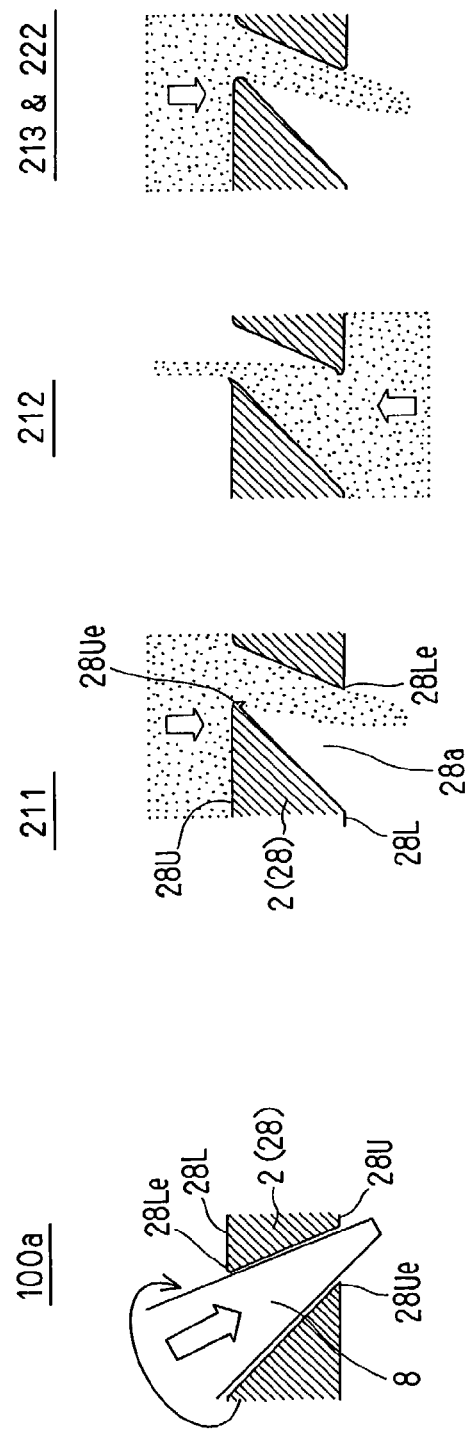

INJECTOR NOZZLE AND METHOD OF MANUFACTURING INJECTOR NOZZLE

CROSS REFERENCE TO RELATED APPLICATION

This application is based on Japanese Patent Applications No. 2001-310624 filed on Oct. 5, 2001, No. 2001-310625 filed on Oct. 5, 2001, No. 2002-199898 filed on Jul. 9, 2002 and No. 2002-199899 filed on Jul. 9, 2002 the contents of which are incorporated herein by reference.

BACKGROUND OF THE INVENTION

1. Field of the Invention

The present invention relates to an injector nozzle and a manufacturing method of the same.

2. Description of Related Art

An injector nozzle is a device for injecting pressurized fluid through a small hole or aperture. For example, an injector nozzle is used for a fuel injector. In such the application, the fuel injector has an orifice as the small hole, and injects fuel into an intake air passage or a combustion chamber. The orifice defines a flow rate and is a principal part for metering an amount of injected fuel. Therefore, it is important to process the orifice precisely.

JP-A-9-209876 discloses a fuel injector and a manufacturing method of the same. In this document, pressurized liquid containing abrasive particles is forcedly run through a hole in order to form a chamfered shoulder on an inlet of the hole. During the processing, a flow rate of the liquid is measured and monitored in order to stop the processing when the measured flow rate reaches to a predetermined value. As a result, it is possible to form a precision hole.

However, in certain applications, the pressurized liquid with abrasive particles may damage a member having the orifice or aperture. For example, in case of a thin plate having an orifice, the thin plate may be deformed by the pressurized liquid.

In another aspect, if a burr remains when flowing the liquid with abrasive particles, the burr may affect the flow and may form uneven flow of the liquid. As a result, the orifice may be trimmed in an undesirable shape.

SUMMARY OF THE INVENTION

It is an object of the present invention to provide an injector nozzle that has a precision aperture.

It is another object of the present invention to provide a manufacturing method of an injector nozzle that is capable of removing a burr on an edge of an aperture or rounding an edge of an aperture.

It is a still another object of the present invention to provide a manufacturing method of an injector nozzle that is capable of trimming an aperture so as to meter a flow amount precisely.

It is a yet another object of the present invention to provide an injector nozzle that is capable of injecting fuel in a desired manner.

According to a first aspect of the present invention, a method of manufacturing an injector nozzle comprises a step of penetrating an aperture on a plate material. The method further comprises a step of trimming the edge of the aperture with a shot blasting process. The shot blasting process enables a precision trimming.

According to an second aspect of the present invention, a method of manufacturing an injector nozzle comprises at least two shot blasting processes having opposite shot directions with respect to the plate material. It is possible to trim both end of the aperture precisely.

It is preferable to invert the shot direction before the edge of the aperture is rolled, since a rolled edge is hard to remove. The method of manufacturing an injector nozzle may comprise three shot blasting processes. The shot directions may be alternated.

According to a third aspect of the present invention, a method of manufacturing an injector nozzle comprises a step of measuring a flow rate of the aperture. The method further comprises a step of shot blasting the plate material with a processing condition that is determined in response to the measured flow rate. It is possible to adjust the flow rate of the aperture in a target flow rate precisely.

The processing condition of the shot blasting process may include a period of time for shot blasting that is determined based on the measured flow rate and a target flow rate.

According to a fourth aspect of the present invention, an injector nozzle comprises an orifice member having an aperture through which fluid is injected. The orifice member has an upper surface and a lower surface which define edges with the aperture. The edges surround both of inlet and outlet opening of the aperture. The edges are rounded, and the surfaces of the rounded edges and both of the upper and lower surfaces are covered with marks formed by a shot blasting process. Such the rounded edges covered with shot blasting marks improves accuracy of direction of fluid injected through the aperture and accuracy of metering of fluid passing through the aperture. In case of forming an acute angle edge on the aperture, it is preferable that the aperture is formed to place the acute angle edge in a manner that the shot blasting processes from both sides of the orifice member is able to process the acute angle edge directly. That is, the opening on one end of the aperture may be positioned so as to enable to see the acute angle edge on the other end of the aperture along a perpendicular direction to the orifice member.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 13A is a cross sectional view of the plate material and an end mill according to a fourth embodiment of the present invention;

FIG. 13B is a cross sectional view of the plate material and a grinding machine according to the fourth embodiment of the present invention;

FIG. 13C is a cross sectional view of the plate material and a grinding machine according to the fourth embodiment of the present invention;

FIG. 14A is a cross sectional view of an orifice member showing a show blasting process according to the fourth embodiment of the present invention;

FIG. 14B is a cross sectional view of an orifice member showing a show blasting process according to the fourth embodiment of the present invention;

FIG. 14C is a cross sectional view of an orifice member showing a show blasting process according to the fourth embodiment of the present invention;

FIG. 14D is a cross sectional view of an orifice member showing a show blasting process according to the fourth embodiment of the present invention;

FIG. 15 is a cross sectional view of the plate material and an electric-discharge machining electrode according to a fifth embodiment of the present invention;

FIG. 16A is a cross sectional view of an orifice member showing a show blasting process according to the fifth embodiment of the present invention;

FIG. 16B is a cross sectional view of an orifice member showing a show blasting process according to the fifth embodiment of the present invention;

FIG. 16C is a cross sectional view of an orifice member showing a show blasting process according to the fifth embodiment of the present invention;

FIG. 17A is a cross sectional view of an orifice member showing a straight aperture according to an embodiment of the present invention;

FIG. 17B is a cross sectional view of an orifice member showing a tapered aperture according to an embodiment of the present invention;

FIG. 17C is a cross sectional view of an orifice member showing an inclined aperture according to an embodiment of the present invention;

FIG. 17D is a cross sectional view of an orifice member showing an inclined and tapered aperture according to an embodiment of the present invention;

DETAILED DESCRIPTION OF PREFERRED EMBODIMENTS

Figure 1:
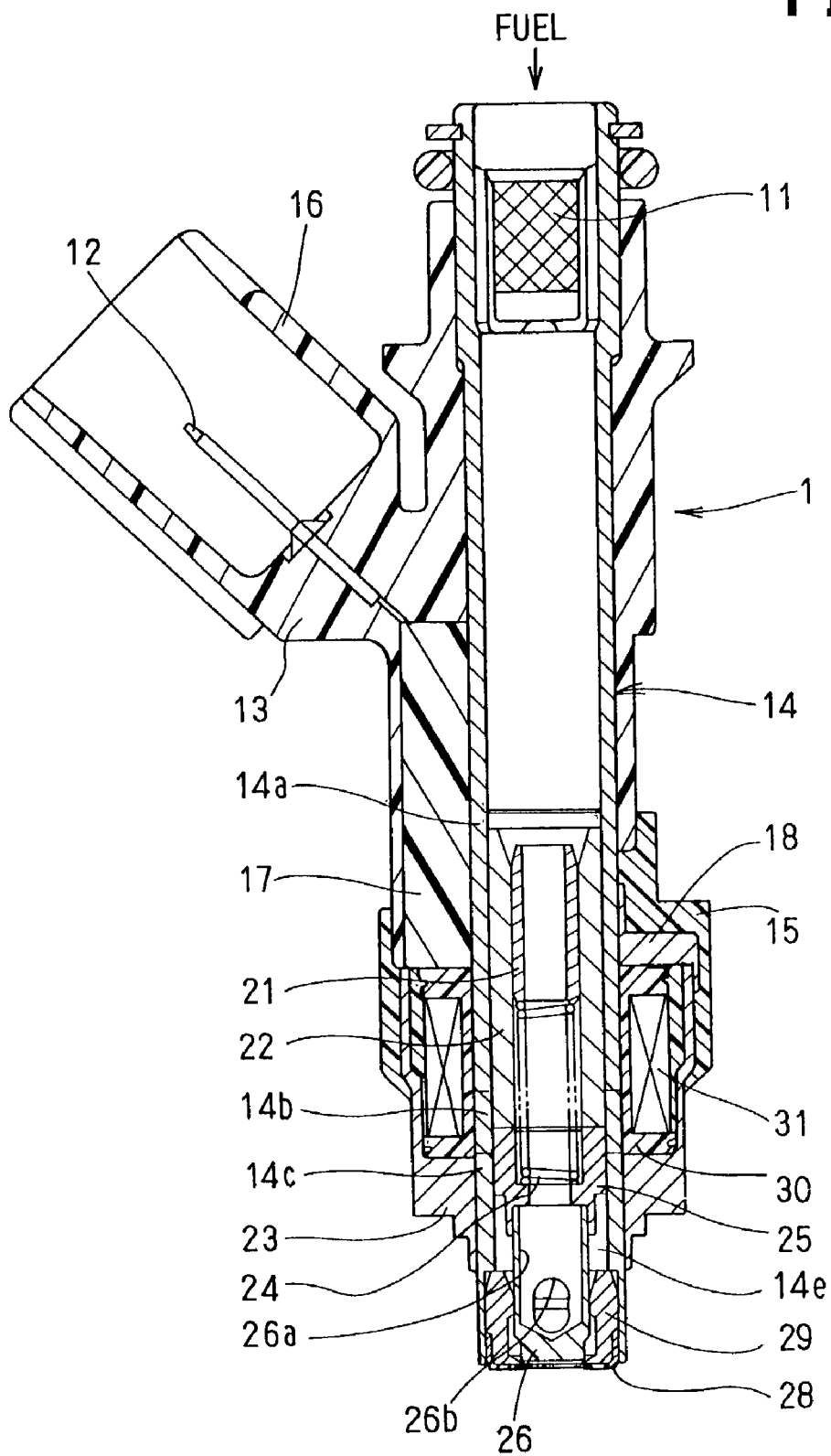
FIG. 1 is a cross-sectional view of a fuel injector according to a first embodiment of the present invention.
Figure 2:
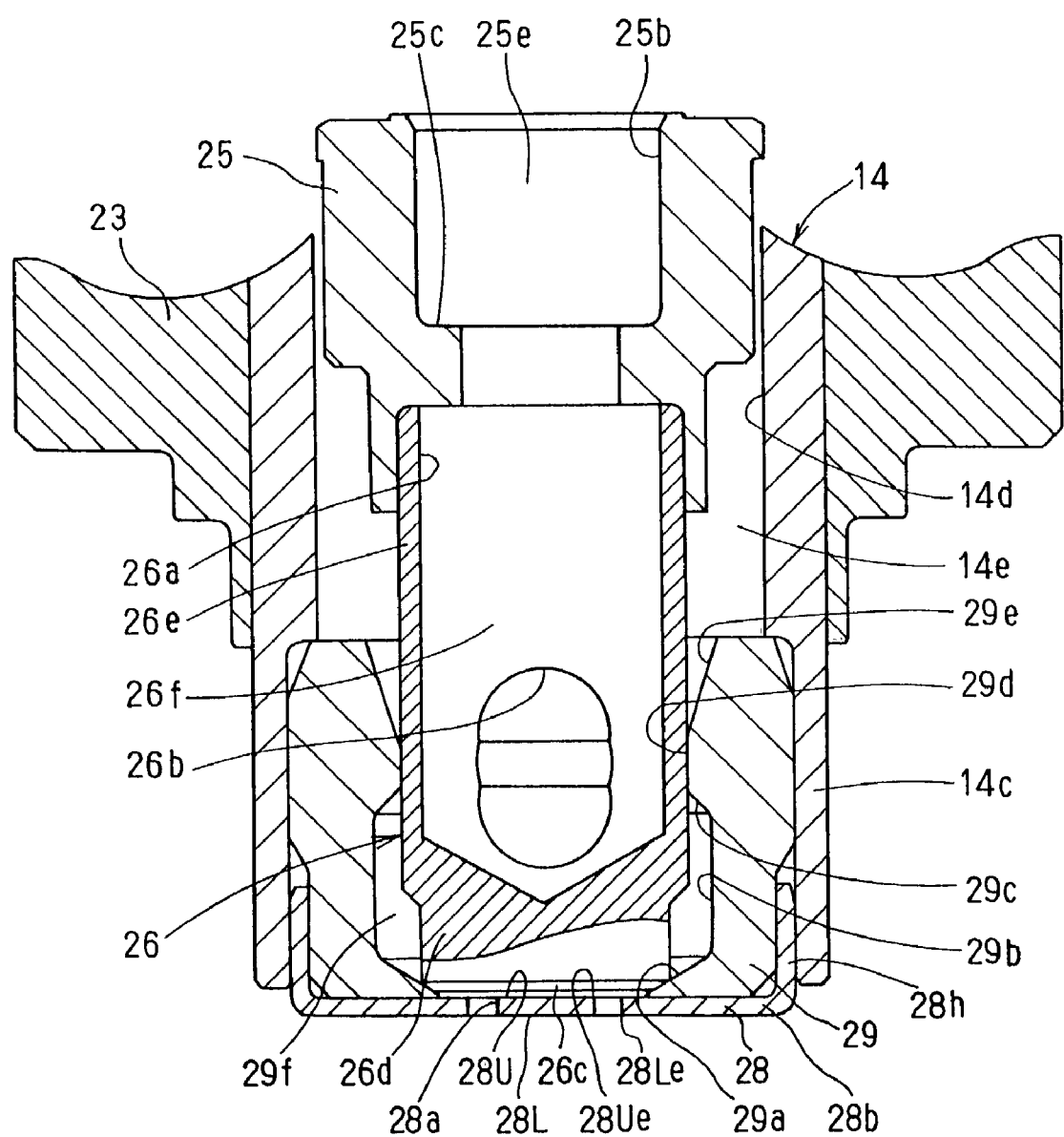
FIG. 2 is an enlarged view of a nozzle part of the fuel injector according to the first embodiment of the present invention.

FIGS. 1 and 2 show a fuel injector according to a first embodiment of the present invention. The fuel injector 1 works as a valve for controlling fuel flow and an injector nozzle for injecting, atomizing and metering fuel. The fuel injector 1 supplies fuel into an intake passage of an internal combustion engine such as a spark ignition type gasoline engine.

Referring to FIGS. 1 and 2, the fuel injector 1 is configured as a cylindrical shape that has a fuel inlet on a top and a fuel outlet on a bottom. The fuel injector 1 has a cylindrical member 14 that extends from the top to the bottom. The cylindrical member 14 has a magnetic portion 14a, nonmagnetic portion 14b and magnetic portion 14c. The nonmagnetic portion 14b is formed by a partial heat treatment. The cylindrical member 14 defines an inner surface 14d and a chamber 14e for accommodating other components. A filter 11 is inserted in the cylindrical member 11.

Electromagnetic components are disposed on the cylindrical member 14. A coil 31 and a bobbin 30 are disposed on the outside of the cylindrical member 14. An extending portion 17 that supports lead wires extends from the coil 31 along the cylindrical member 14. A fan shaped magnetic member 18 is attached on the magnetic portions 14a. A cup shaped magnetic member 23 is attached on the magnetic portion 14c. The magnetic members 18 and 23 are connected so as to bridge between the magnetic portion 14a and the magnetic portion 14c through an outside the coil 31, and provide a magnetic path. A pair of terminals 12 for the coil 31 is exposed on the side of the injector 1. A resinous member 13 is formed on the cylindrical member 14. The resinous member 13 forms a connector casing 16. The coil 31, the bobbin 30 and the magnetic member 18 are covered with a resinous member 15.

A stator core 22 made of magnetic material is press fitted in the cylindrical member 14 so that the stator core 22 works as an attracting member. A moving core 25 is movably housed in the cylindrical member 14 so that the moving core 25 works as an armature. The stator core 22 is partially protruded into an inside of the non-magnetic portion 14b. The moving core 25 is formed in a generally cylindrical shape. The moving core 25 is disposed over the non-magnetic portion 14b and the magnetic portion 14c. The moving core 25 has an inner surface that defines an inner cavity 25e, and a spring seat 25c. When the coil 31 is excited, magnetic flux flows through the stator core 22, the moving core 25, the magnetic portion 14c, the magnetic member 23, the magnetic member 18 and the magnetic portion 14a, and the moving core 25 is attracted toward the stator core 22. An adjusting pipe 21 is press fitted in the stator core 22. A coil spring 24 is disposed between the adjusting pipe 21 and the moving core 25. The coil spring 24 urges the moving core 25 in a direction to separate from the stator core 22.

Valve components for opening and closing a fuel passage are arranged in the cylindrical member 14. A valve body 29 is disposed in the bottom of the cylindrical member 14. The bottom of the cylindrical member 14 is processed in slightly thinner to receive the valve body 29. The valve body 29 is formed in a cylindrical shape. The valve body 29 has a tapered inner wall on a bottom portion for defining a valve seat 29a and a bottom opening. The valve body 29 further defines a straight cylindrical surface 29b, an expanding conical surface 29c, a straight cylindrical surface 29d and a shrinking conical surface 29e on the inside thereof. The straight cylindrical surface 29d forms a guide surface for guiding a movable valve member.

A valve needle 26 is disposed in the valve body 29. The valve needle 26 is generally formed in a cup shape. The valve needle 26 has a cylindrical portion 26e and a columnar portion 26d. The cylindrical portion 26e is slidably contact with the guide surface 29d. A through hole 26b is formed on the cylindrical portion 26e. The columnar portion 26d is formed in a slightly smaller in diameter than the cylindrical portion 26e. The columnar portion 26d has a chamfered surface on a bottom edge thereof for defining a contact portion 26c. The contact portion 26c is formed to be contact with the valve seat 29a for opening and closing a fuel passage formed in the valve body 29. An upper end of the valve needle 26 is connected with the moving core 25 so that the valve needle 26 moves together with the moving core 25. The valve body 29 and the valve needle 26 define a fuel chamber 29f just upstream the valve seat 29a and the contact portion 26c. The fuel chamber 29f communicates with the inlet formed on the top of the fuel injector 1 via the components described above. Therefore, when the coil 31 is excited, the contact portion 26c moves upwardly, and the fuel in the fuel chamber 29f flows out through the valve seat 29a and the bottom opening.

Nozzle components for injecting, atomizing and metering fuel are arranged in the cylindrical member 14. An orifice member 28 is disposed on the bottom of the fuel injector 1. The orifice member 28 is made of metal that is possible to process by machining, such as stainless steel. The orifice member 28 is formed in a cup shape. The orifice member 28 covers the bottom of the valve body 29, and the bottom opening defined on the valve body 29. The orifice member 28 has a plate portion 28b and a sidewall portion 28h inserted between the cylindrical member 14 and the valve body 29. The plate portion 28b has at least one aperture 28a as an orifice for injecting, atomizing and metering fuel. The aperture 28a penetrates the plate portion 28b. In this embodiment, the plate portion 28b has a plurality of apertures 28a. An upper edge 28Ue is defined between the aperture 28a and an upper surface 28U of the plate portion 28b. A lower edge 28Le is defined between the aperture 28a and a lower surface 28L of the plate portion 28b. The aperture 28a is about 0.1 mm in diameter. The components are fixed by appropriate method such as a laser welding or the like.

According to the arrangement described above, fuel is injected through the aperture 28a when the coil 31 is excited. An amount of injected fuel is defined by a period of time for injecting fuel and the aperture 28a.

Figure 3:
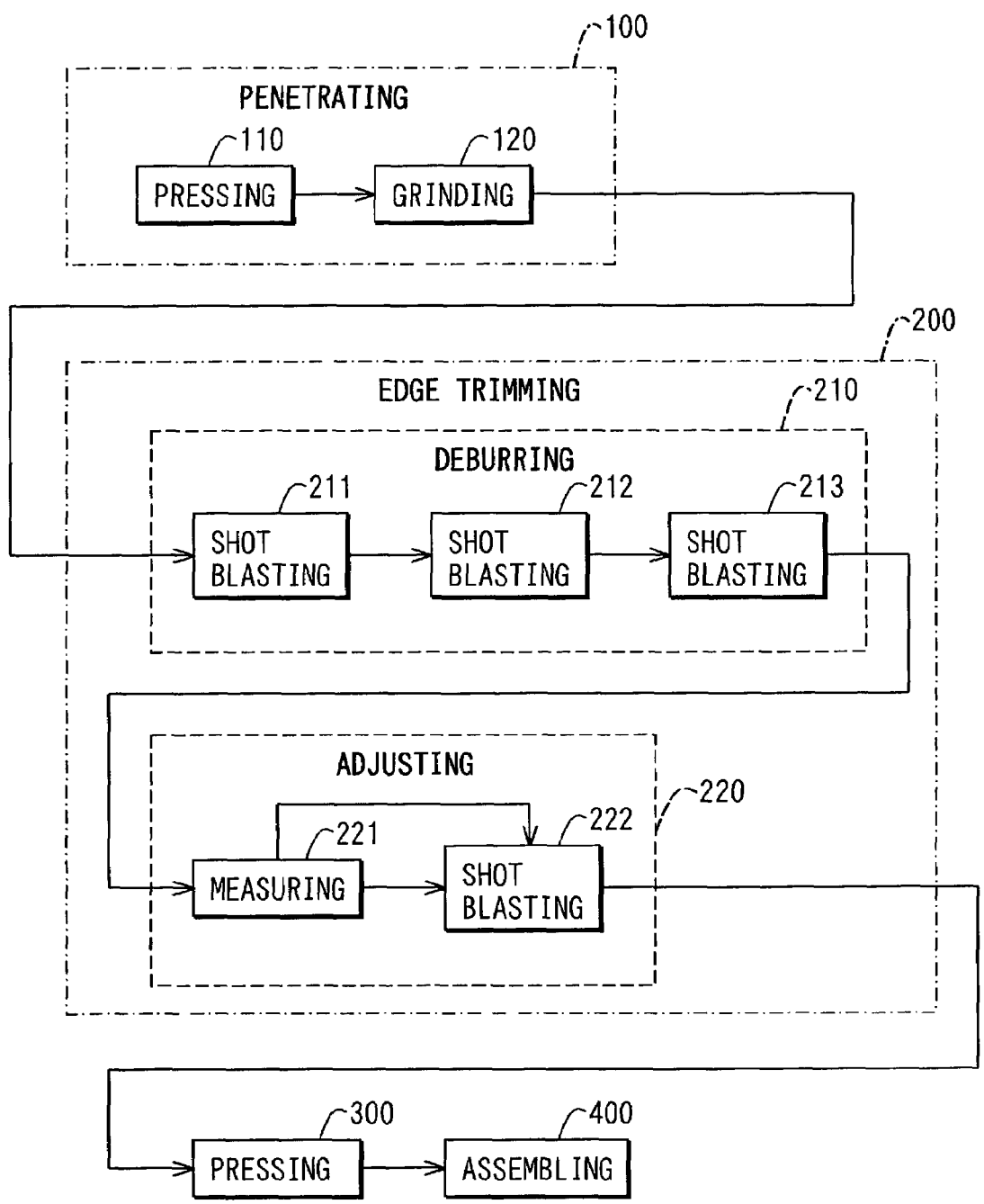
FIG. 3 is a block diagram showing a manufacturing process of an injector nozzle according to the first embodiment of the present invention.
Figure 4:
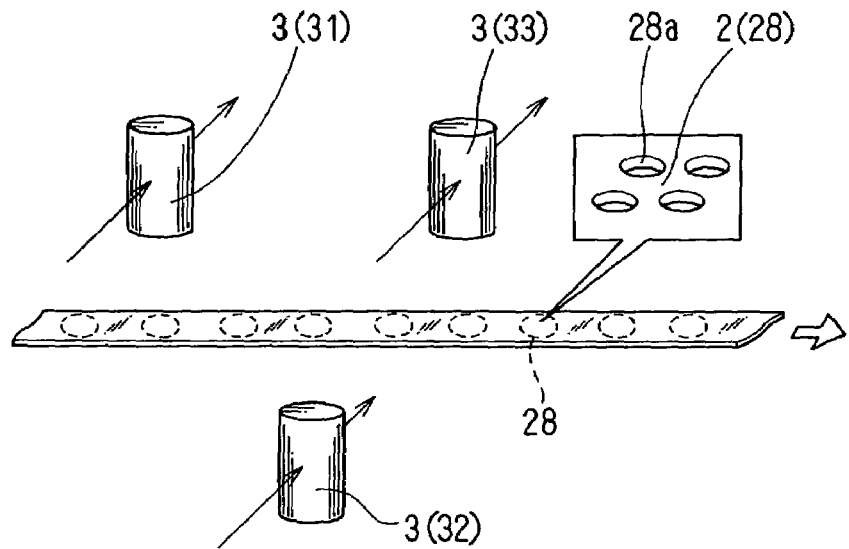
FIG. 4 is a perspective view of a plate material and shot blasting machines according to the first embodiment of the present invention.

The orifice member 28 is manufactured through the following manufacturing process. FIG. 3 is a block diagram showing a manufacturing process of the orifice member 28. The process includes a penetrating process 100, an edge trimming process 200, a pressing process 300 and an assembling process 400. The penetrating process 100 is a process for forming the aperture 28a on a plate material such as a belt shaped material as shown in FIG. 4. The edge trimming process 200 is a process for trimming edges of the aperture 28a into a desirable shape. The pressing process 300 is a process for forming the plate material into the cup shape as shown in FIG. 2. In the process 300, the circular plates corresponding to the orifice members 28 are cut from the plate material 2, and then each of the circular plates is pressed into the cup shape. The assembling process 400 is a process for assembling the orifice member 28 on the injector 1 as shown in FIGS. 1 and 2.

The penetrating process 100 includes a pressing process 110 and a grinding process 120. In the penetrating process, a plurality of apertures, e.g. four (4) apertures 28a, are formed in one orifice member 28. A plurality of orifice members 28 are formed on the plate material 2 along a longitudinal direction as shown in FIG. 4. Referring to FIG. 4, each circular area indicated by broken line corresponds to the orifice member 28. Each area includes four (4) apertures 28a. The orifice members 28 may be formed on the plate material 2 in a plurality of rows such as two rows.

Figure 5:
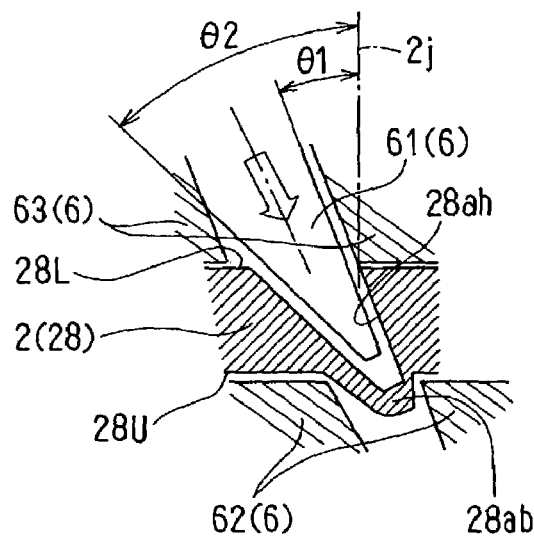
FIG. 5 is a cross sectional view of the plate material and a pressing machine according to the first embodiment of the present invention.

In the pressing process 110, the plate material 2 is subject to a pressing process as shown in FIG. 5. Referring to FIG. 5, the plate material 2 is placed between a die 62 and a punch guide 63 of a pressing machine 6. The die 62 defines a receiving hole. The punch guide 63 has a guide hole for guiding a punch 61. The punch 61 is a generally conical shape. The conical surface of the punch 61 defines an inclined angle θ1 and θ2 from a line 2j perpendicular to a surface of the plate material 2. The punch guide 63 has a supporting hole that supports the punch 61 in an inclined manner as shown in FIG. 5, and slidably supports the punch 61 along a central axis of the conical surface.

In the pressing process 110, the punch 61 is driven into the plate material 2 so as to form a protrusion 28ab on the other side of the plate material 2. The punch 61 is driven from the lower surface 28L to the upper surface 28U to form a conical aperture expanding in a flow direction of fuel. The punch 61 is driven in an inclined manner to form an inclined aperture in order to control a direction of fuel injection. The punch 61 is driven more than the thickness of the plate material 2. But driving the punch 61 is stopped before the punch 61 penetrates the plate material 2. The punch 61 stops before the punch 61 forms a shear failure on an inner surface 28ah. As a result, a depression having bottom is formed on the plate material. An inner surface 28ah is formed in a smooth surface without a shear failure or a shear crack. Alternatively, the punch 61 may penetrate the plate material 2.

Figure 6:
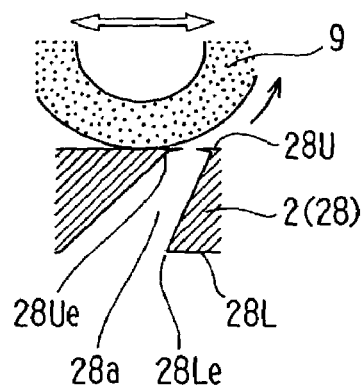
FIG. 6 is a cross sectional view of the plate material and a grinding machine according to the first embodiment of the present invention.

Then, the upper surface 28U is grinded by a grinder 9 so as to remove the protrusion 28ab and opens the bottom of the depression. In the grinding process 120, only the upper surface 28U is subject to the grinding. During grinding, although the protrusion 28ab is removed and the aperture is opened on the both sides, some burrs are formed on the edge 28Ue. Due to the grinding, the burrs extend in parallel to the upper surface 28U and are directed into the aperture 28a as shown in FIGS. 6 and 8B.

The edge trimming process 200 includes a deburring process 210 and an adjusting process 220. The deburring process 210 is a process for removing the burrs formed on the edge of the aperture 28a. The adjusting process 220 is a process for adjusting the shape of the aperture so as to inject a predetermined amount of fuel. The edge trimming process 200 includes a plurality of shot blasting process 211, 212, 213, and 222. The shot blasting is carried out to remove the burrs formed on the edge around the aperture 28a. The shot blasting is also carried out for trimming or adjusting a shape of the edge. For example, the shot blasting is carried out so that the edge is formed in a predetermined rounded shape or R-chamfered shape and so that the aperture 28a has a predetermined flow resistance to restrict fuel flow in a predetermined flow rate.

The edge trimming process 200 includes at least one shot blasting process in a fuel flow direction that processes the orifice member 28 from the upper surface thereof and at least one shot blasting process in a counter fuel flow direction that processes the orifice member 28 from the lower surface thereof. Preferably, the edge trimming process 200 is started and completed with the shot blasting process in the fuel flow direction in order to trim the inlet opening of the aperture 28a precisely. Therefore, preferably, the edge trimming process 200 includes at least three shot blasting processes that process the upper and lower surface of the orifice member 28 in an alternate manner. The edge trimming process 200 may be started and completed with the shot blasting process in the fuel flow direction, and have the shot blasting process in the counter fuel flow direction therebetween.

Figure 7:
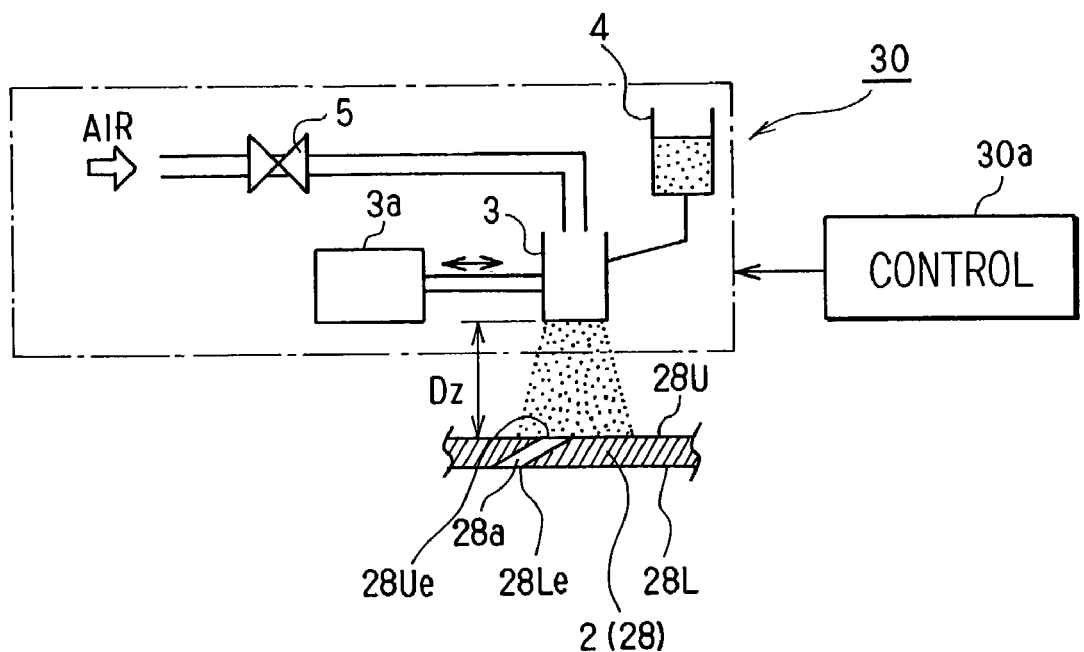
FIG. 7 is a block diagram showing the shot blast machine according to the first embodiment of the present invention.

The shot blasting is carried out by means of a stream of abrasive particles blown by a pressurized air. The other alternative power source such as a centrifugal force or impact shock may be used for shooting the abrasive particles. In the edge trimming process 200, a shot blasting is carried out by at least one shot blast machine 30 as shown in FIG. 7. In the first embodiment, three shot blast machines are used for the deburring process 210 and a shot blast machine is used for the adjusting process 220. The orifice member can be repeatedly processed by a single machine.

The shot blast machine has a nozzle 3, a hopper 4 for the abrasive particles, an electromagnetic air valve 5 disposed on an air conduit, a slider 3a, and a controller 30a. The hopper 4 supplies the abrasive particles to the nozzle 3. The machine 30 is supplied with pressurized air as a power source for blowing the abrasive particles. The abrasive particles are blown out from the nozzle 3 with pressurized air as shown in FIG. 7. The electromagnetic air valve 5 is capable of opening and closing the air conduit and controlling an amount of air. The nozzle 3 is movably supported and can be positioned on a first position in which the nozzle 3 is located above the orifice member 28 and the abrasive particles impact onto the orifice member 28 and a second position in which the nozzle 3 is located off the orifice member 28 and the abrasive particles can not impact the orifice member 28. The slider 3a operatively connected with the nozzle 3 to move the nozzle 3 in a transverse direction with respect to the belt shaped plate material 2 between the first position and the second position.

The abrasive particles are made of a ceramic material such as SiC. The size of abrasive particles is about 10–20 $\mu$m. The size of abrasive particles is set about 1/5 of the minimum diameter of the aperture 28a in order to prevent clogging.

The controller 30a performs as a means for setting and adjusting a blasting condition such as an amount of the abrasive particles and energy of the abrasive particles. A period of time for blasting and a supply rate (weight per unit time) of the abrasive particles from the hopper 4 can control the amount of the abrasive particles. A distance Dz between the nozzle 3 and the target 2 and a blasting speed of the abrasive particles (air pressure) can control the energy of the abrasive particles.

In this embodiment, the controller 30a controls the slider 3a for adjusting the period of time for blasting. In order to control the period of time for blasting, the controller 30a drives the slider 3a so that the nozzle 3 is positioned in the first position for a predetermined time. Such a blasting time control by moving the nozzle 3 enables a precise control of the blasting time. The controller 30a may control the other parameters defining the blasting condition such as the distance Dz or the air pressure.

The deburring process 210 includes three shot blasting processes 211, 212 and 213 as shown in FIG. 3. The deburring process 210 includes at least one shot blasting process 211 or 213 in a first direction and at least one shot blasting process 212 in a second direction that is counter direction to the first direction. In a first shot blasting process 211, the abrasive particles are shot onto the upper surface 28U in a direction of fuel injection. In a second shot blasting process 212, the abrasive particles are shot onto the lower surface 28L in a counter direction of fuel injection. In a third shot blasting process 213, the abrasive particles are shot onto the upper surface 28U in the direction of fuel injection again.

During the edge trimming process 210, the plate material 2 is conveyed in its longitudinal direction in a step-by-step manner with a pitch of the orifice member 28 formed on the plate material 2. In the first embodiment, the plate material 2 is conveyed in a step-by-step manner with a constant interval from the pressing process 110 to the pressing process 300. For providing the shot blasting process 211, 212, 213, three nozzles 31, 32, 33 are located along the plate material 2. The nozzle 31 and 33 are directed onto the upper surface 28U and the nozzle 32 is directed onto the lower surface 28L as shown in FIG. 4. The nozzles 31, 32, and 33 are independently or synchronously moved in the transverse direction by the sliders 3a respectively.

Figure 8A:
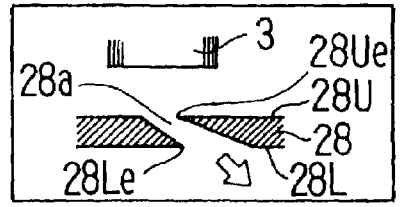
FIG. 8A is a cross sectional view showing a relative location of a nozzle and the plate material according to the first embodiment of the present invention.
Figure 8B:
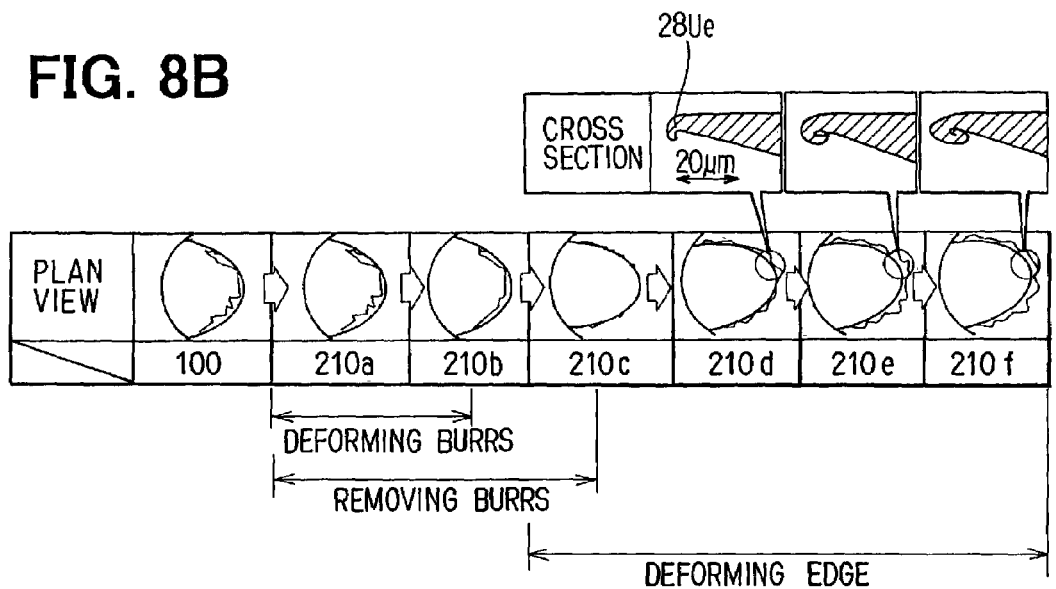
FIG. 8B is a view showing a progress of deformation of edge by a shot blasting according to the first embodiment of the present invention.

FIG. 8 shows a progress of a shot blasting process in the direction of fuel injection. FIG. 8A shows a condition of the shot blasting process. FIG. 8B shows plan views of the edge 28Ue on the upper surface 28U viewing from the lower surface 28L through the lower opening of the aperture 28a. The aperture 28a has the burrs almost around the upper opening of the aperture 28a. Moreover, since the aperture 28a is inclined with respect to the perpendicular direction of the plate material 2, the edge 28Ue has an acute angle edge and an obtuse angle edge. The obtuse angle edge can be seen from the lower surface 28L through the aperture 28a. The burrs formed on the obtuse angle edge are rather easy to remove, since the burrs are significantly weaker than the obtuse angle edge. However, the burrs formed on the acute angle edge are difficult to remove, sine the acute angle edge is easy to deform similar to the burrs. Therefore, the burrs formed on the obtuse edge are easily and perfectly removed by the first shot blasting process 211 and the third shot blasting process 213. In this embodiment, the shot blasting processes are designed to remove the burrs formed on the acute angle edge clearly and to prevent undesirable deformation on the acute angle edge.

If the aperture 28a is subject to the shot blasting process in the first direction only, the shape of the acute angle edge is gradually changed as shown in FIG. 8B. Referring to FIG. 8B, before the shot blasting, the acute angle edge has the burrs as shown in a box 100. As the shot blasting continues, the burrs are gradually deformed in a shot direction from a step 210a to a step 210b. Then, the burrs are gradually removed from a step 210a to a step 210c. The burrs almost removed at the step 210c. However, the acute angle edge is also deformed from the step 210c. After that, the acute angle edge is gradually deformed into the aperture 28a and is roll into the aperture 28a. If the acute angle edge is rolled as shown in the step 210e, such a rolled edge is hardly removed. The obtuse angle edge keeps its original shape even in the step 210e. In order to avoid the rolled edge, the shot directions of the shot blasting processes are inverted before the edge is rolled, therefore, the first shot blasting process 211 is stopped at the step 210d. In the step 210d, the acute angle edge is directed in the perpendicular direction but is not rolled.

Figure 9:
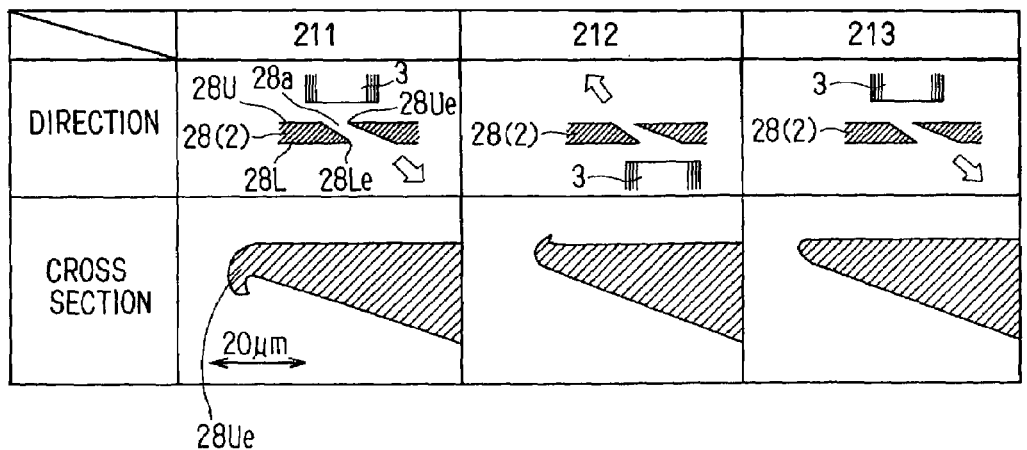
FIG. 9 is a view showing a progress of the deburring process according to the first embodiment of the present invention.

FIG. 9 shows cross sectional views of the acute angle edge in each of the shot blasting processes 211, 212 and 213. In the first shot blasting process 211, as described above, the acute angle edge is deformed as shown in the left side of FIG. 9. The nozzle 31 is quickly moved from the first position to the second position when the first shot blasting process 211 is executed for a predetermined time that is experimentally determined so as to deform the acute angle edge as shown in FIG. 9. The first shot blasting process 211 also works to increase hardness of the surface of the plate material. Then, the plate material 2 is conveyed forward to place the processed orifice member 28 above the nozzle 32.

In the second shot blasting process 212, the nozzle 32 shoots the abrasive particles onto the lower surface 28L until the acute angle edge is deformed as shown in the middle of FIG. 9. In the second shot blasting process 212, the deformed acute angle edge in the first shot blasting process 211 is reversed and removed. Since the hardness of the acute angle edge is increased by the first shot blasting process 211, the deformed portion of the acute angle edge can be easily removed by impact of the abrasive particles. However, a small burr may be formed and still remain on the upper surface 28L. The second shot blasting process 212 is executed for a predetermined time that is experimentally determined so as to deform the acute angle edge as shown in FIG. 9. The period of time of the second shot blasting process 212 is also controlled by moving the nozzle 32 in the transverse direction. The period of time of the second shot blasting process 212 may be set equal to or shorter than that of the first shot blasting process 211. Then, the plate material 2 is conveyed forward to place the processed orifice member 28 under the nozzle 33.

In the third shot blasting process 213, the nozzle 33 shoots the abrasive particles onto the upper surface 28U again. The third shot blasting process 213 is executed until the small burr formed in the second shot blasting process 212 is removed as shown in the right side of FIG. 9. The period of time of the third shot blasting process 213 may be set equal to or shorter than that of either the first and second shot blasting processes 211, 212.

As a result, the edge 28Ue is trimmed in a smooth rounded shape or R-chamfered shape. Therefore, the aperture 28 is possible to direct fuel in a predetermined direction and is less resistive to the fuel flow.

In the deburring process 210, as the deburring process proceeds, the apertures 28a are gradually enlarged and the radii of the edges 28Ue and 28Le are also gradually enlarged. Therefore, hydraulic resistances of the apertures 28a are decreased to increase flow rate in case of that fuel is supplied to the apertures 28a. In this embodiment, a total processing time for the shot blasting processes is determined slightly less than a processing time that makes the apertures 28a to permit a target flow rate. The final precision trimming of the edges is carried out in the following adjusting process 220.

The plate material 2 is conveyed to the adjusting process 220. The adjusting process 220 includes a measuring process 221 and a shot blasting process 222. In the measuring process 221, the aperture 28a is inspected by measuring an actual flow rate passing through the aperture 28a by placing the aperture 28a in a measuring device. In this embodiment, a total flow rate of fuel through four apertures 28a belonging one orifice member 28 is measured. The measuring device supplies pressurized fuel or measuring fluid to the orifice member, and measures a flow rate passing through the apertures 28a.

The measured flow rate is inputted into the controller 30a of the shot blast machine 30 for the shot blasting process 222. The controller 30a compares the measured flow rate and a predetermined target flow rate and determines a period of time of fourth shot blasting process for adjusting the actual flow rate into the target flow rate. For example, the controller 30a determines the period of time based on a difference between the measured flow rate and the target flow rate so that the actual flow rate approaches to and coincides with the target flow rate. Therefore, the measured flow rate is reflected on the following shot blasting process 222 that is performed on the plate material having the aperture measured.

The controller 30a may vary the other processing condition of the shot blasting process 222 in response to the measured flow rate. For example, the controller 30a may set a constant period of time, and control an air pressure and/or a flow rate of the abrasive particles in response to the measured flow rate.

Then, the plate material 2 is again placed in a shot blast machine. In the shot blasting process 222, the controller 30a places the nozzle above the orifice member 28 which is measured in the measuring process 221. The nozzle is placed above the orifice member 28 for the period of time determined so that a flow rate of the apertures 28a becomes the target flow rate. Then, when the predetermined time is elapsed, the controller 30a drives the slider 3a to move the nozzle 3 to the second position. During the shot blasting process 222, the radius of the rounded edge 28Ue is enlarged and an amount of slope around the inlet of the aperture 28a is also enlarged. Therefore, the aperture 28a enables more flow rate as the shot blasting process 222 continues. As a result, it is possible to form the precision apertures 28a that is capable of injecting the predetermined target flow rate.

Figure 10A:
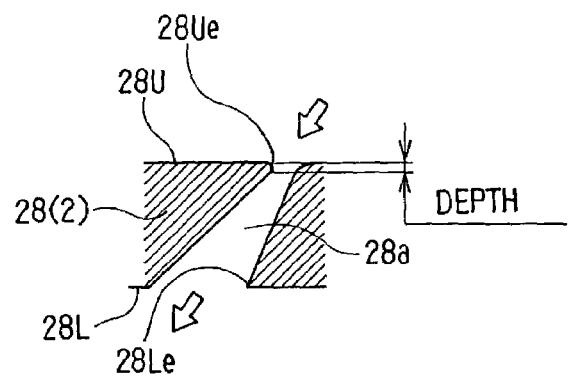
FIG. 10A is a cross sectional view of the plate material showing a depth according to the first embodiment of the present invention.
Figure 10B:
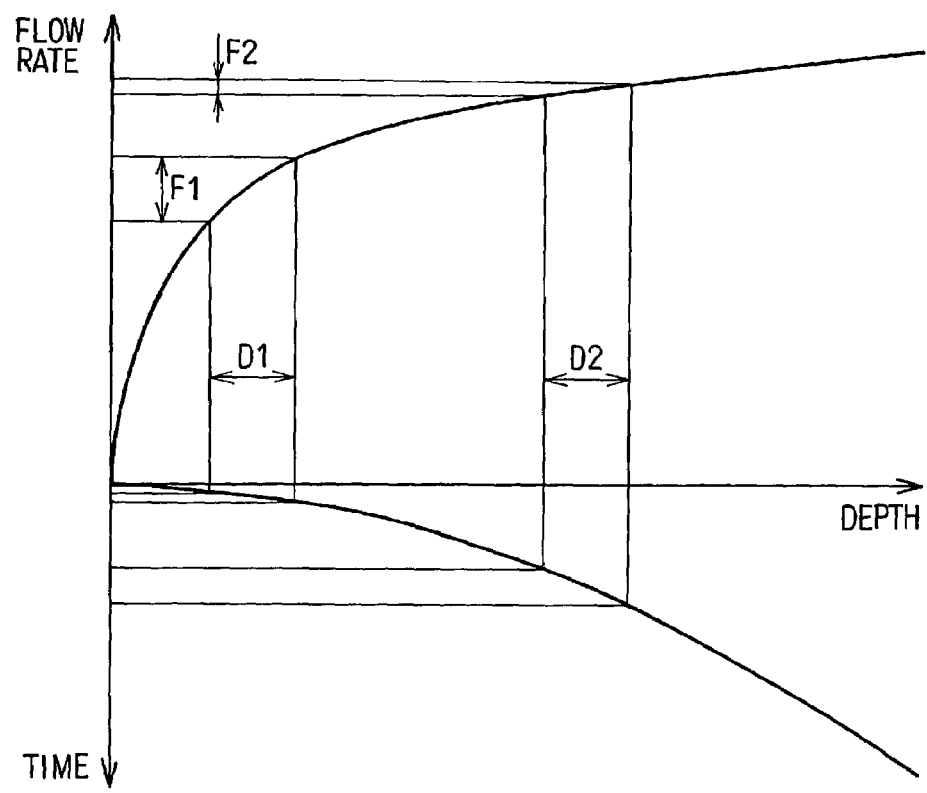
FIG. 10B is a graph showing a relationship among a period of time of the shot blasting process, the depth shown in FIG. 10A, and a flow rate of the aperture according to the first embodiment of the present invention.

FIG. 10A shows a depth of the edge 18Ue. The depth is measured from the upper surface 28U to a top of the edge 28Ue. Therefore, the depth includes a slope formed around the inlet of the aperture 28a and the chamfer of the edge 28Ue. FIG. 10B is a graph showing a relationship among a period of time of the shot blasting, a depth of the edge 28Ue, and a flow rate. Referring to FIG. 10B, the relationship between the period of time of the shot blasting and the flow rate is modulated by the depth. For example, if the depth is relatively small, a small time difference corresponds to a depth difference D1, and causes a flow rate change F1. On the contrary, is the depth if relatively large, relatively large time difference corresponds to a depth difference D2 that is equal to the depth difference D1, and causes a flow rate difference F2 that is significantly smaller than F1. Therefore, in order to control the flow rate precisely, it is preferable to form a relatively small diameter of aperture 28a in the penetrating process 100 and to form a relatively large slope and chamfer in the edge trimming process 200. Such a greater depth enables relatively rough control of the period of time for the shot blasting in the adjusting process 220, but requires long processing time in the deburring process 210. According to the first embodiment, the period of time for the shot blasting process can be controlled precisely since the nozzle is moved to start and finish the process, therefore, it is possible to form the apertures 28a that have relatively small depth.

Figure 21:
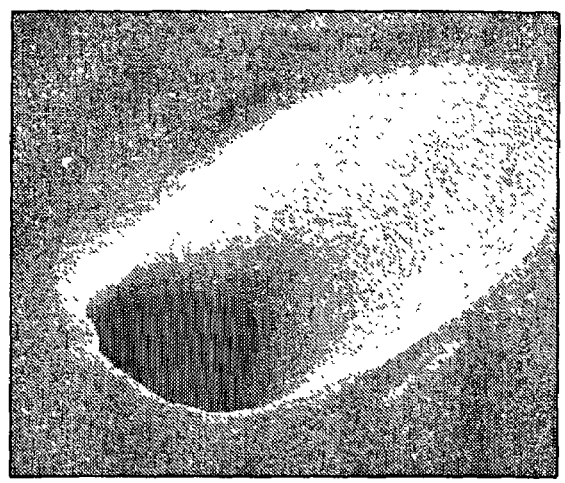
FIG. 21 is a plane view of an aperture viewing from the lower surface according to the first embodiment of the present invention.
Figure 20:
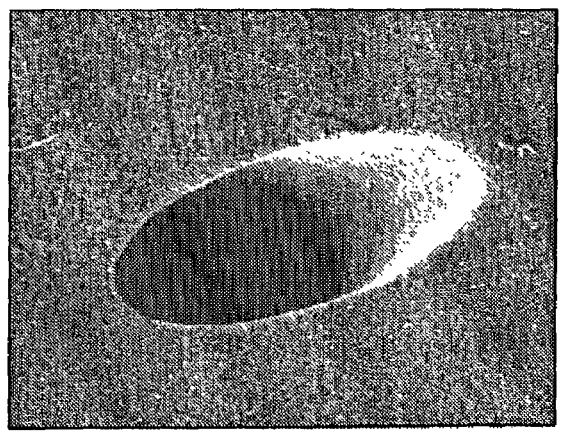
FIG. 20 is a plan view of an aperture viewing from the upper surface according to the first embodiment of the present invention.
Figure 19:
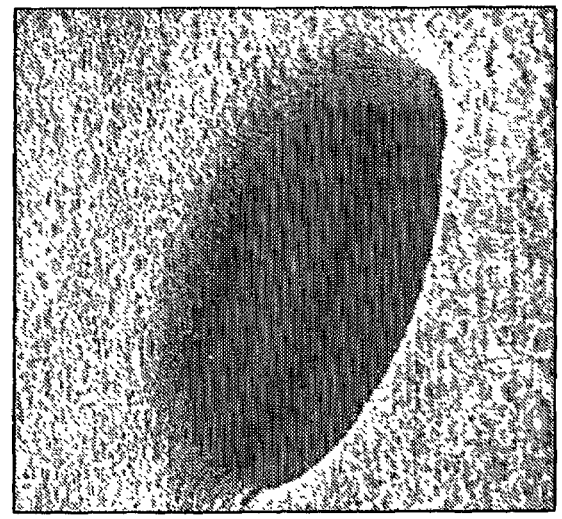
FIG. 19 is a perspective view of an aperture according to the first embodiment of the present invention.

FIG. 19 shows a perspective view of the aperture 28a. Referring to FIG. 19, the orifice member 28 has an even surface without protrusions or burrs. The edge of the aperture 28a is rounded smoothly and has no burrs. FIG. 20 shows an inlet opening of the aperture 28a. FIG. 20 shows the entire upper edge 28Ue and a part of the lower edge 28Le that is the acute angle edge. FIG. 21 shows an outlet opening of the aperture 28a. FIG. 21 shows the entire lower edge 28Le and a part of the upper edge 28Ue that is the acute angle edge. Both the upper and lower edges 28Ue and 28Le are rounded smoothly and with no burrs. Especially, the acute angle edges are not rolled and have no deformations. As shown in FIGS. 20 and 21, the apertures 28a are formed to make it possible to see the acute angle edge on the other side along a perpendicular direction to the plate material. Therefore, the abrasive particles can directly impact on both sides of the acute angle edges. The surfaces of the edges 28Ue and 28Le and both the upper surface 28U and the lower surface 28L are completely covered with marks made by the shot blasting processes. Such the edges covered with shot blasting marks are formed precisely enough to improve accuracy of fuel injection direction and accuracy of fuel metering.

Hereinafter, modified embodiments are explained. In the following embodiments, the same or similar elements in any one of the preceding embodiment are indicated by the same reference numbers, and the differences from the preceding embodiment are mainly explained.

Figure 11:
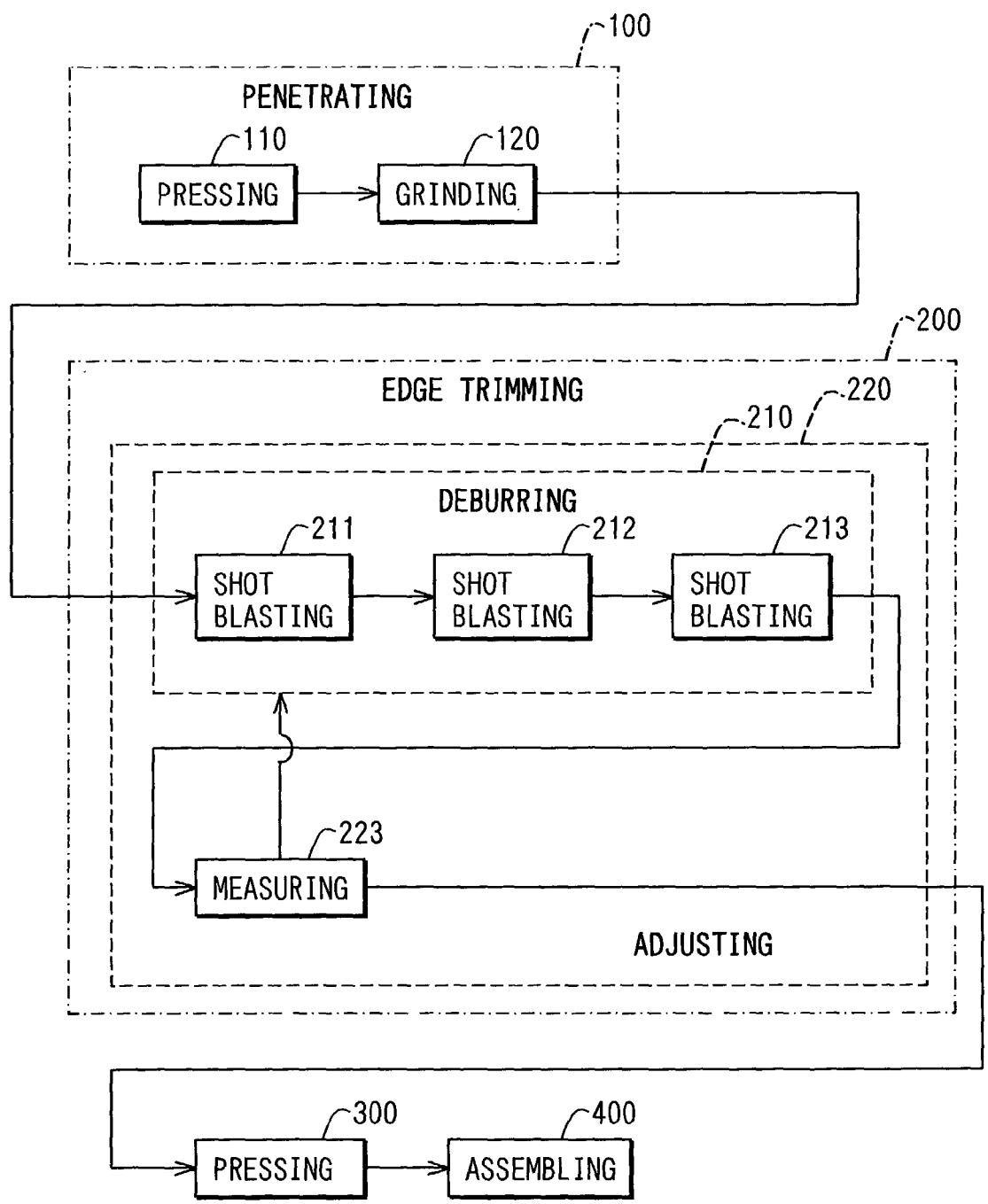
FIG. 11 is a block diagram showing a manufacturing process of an injector nozzle according to a second embodiment of the present invention.

FIG. 11 shows a manufacturing method of the injector nozzle according to a second embodiment of the present invention. An adjusting process 220 is performed by a measuring process 223 and the deburring process 210. The measuring process 223 measures a flow rate of one of the orifice member 28 that is already trimmed. The measuring process 223 outputs and feedbacks the measured flow rate to the preceding deburring process 210 in order to adjust a flow rate of another following orifice members 28. At least one of the controllers 30a in the shot blasting processes 211, 212 and 213 inputs the measured flow rate, and corrects the period of time for the shot blasting respectively. For example, if the measured flow rate is smaller than the predetermined flow rate, the controller 30a extends the period of time for the shot blasting. Therefore, the measured flow rate is reflected on the preceding shot blasting process 210 that would be performed on another plate material that has an aperture not yet measured.

In this embodiment, a total processing time period would be a sum of a processing time period for deburring and trimming the edge and a processing time period for adjusting the flow rate. Preferably, the controller 30a in the third shot blasting process 213 alone is responsive to the measured flow rate. In this case, a period of time for the third shot blasting process 213 is a period of time for trimming and finishing the edge and a period of time for adjusting the actual flow rate to the target flow rate.

Figure 12:
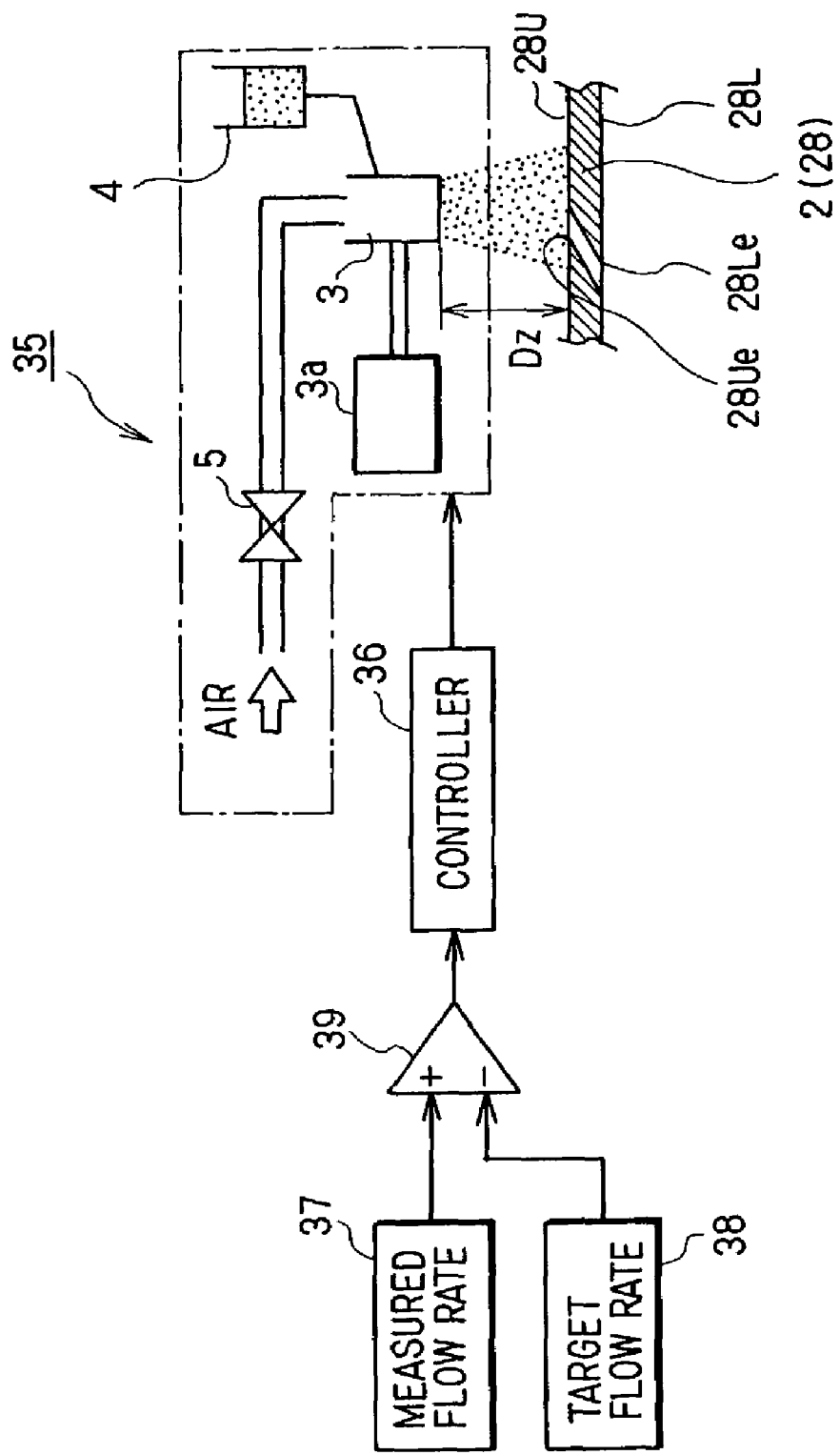
FIG. 12 is a block diagram showing the shot blast machine according to a third embodiment of the present invention.

FIG. 12 is a block diagram showing a shot blast machine according to a third embodiment of the present invention. In the third embodiment, only one shot blast machine 30 is repeatedly used for providing four shot blasting processes shown in FIG. 3. Although, a plurality of orifice members 28 are formed on the plate material 2 in the first embodiment, individual pieces of the orifice members 28 are machined in each process. The orifice member 28 is turned upside down between the first shot blasting process 211 and the second shot blasting process 212, and between the second shot blasting process 212 and the third shot blasting process 213. The shot blast machine 35 has a controller 36 for controlling the components. The controller 36 controls a period of time for shot blasting by moving the nozzle between the first position and the second position. The controller 36 may control the electromagnetic valve 5 to control the period of time for shot blasting. The controller 36 also controls a blasting pressure by an opening degree of the electromagnetic valve 5, a supply rate of the abrasive particles and the distance Dz. Further, the shot blast machine 35 has a means 37 for inputting a measured flow rate from the measuring process 221, a means 38 for setting a target flow rate, and a means 39 for adjusting the period of time for shot blasting. The means are provided by electric components such as a variable resistor and a comparator. The means 37, 38 and 39 are activated in the fourth shot blasting process 222.

FIGS. 13 and 14 show a fourth embodiment of the present invention. In this embodiment, an end mill process 110a is carried out instead of the pressing process 110 in the first embodiment. FIG. 13A is a cross sectional view showing an end mill process using a conical end mill 7. The end mill process 110a penetrates the plate material 2, and forms burrs on both of the upper and lower edges 28Ue and 28Le. In order to remove the burrs, in this embodiment, a first grinding process 120a and a second grinding process 120b are carried out instead of the grinding process 120 in the first embodiment. FIG. 13B shows a first grinding process 120a. The lower surface 28L is grinded by a grinder 9 to remove the burrs formed in the end mill process 110a. The first grinding process 120a forms burrs extending into the aperture 28a. FIG. 13C shows a second grinding process 120b. The upper surface 28U is grinded by a grinder 9 to remove the burrs formed in the end mill process 110a. The second grinding process 120b also forms burrs extending into the aperture 28a.

FIGS. 14A, 14B, 14C and 14D show an edge trimming process of the fourth embodiment. FIG. 14A shows a beginning of the first shot blasting process 211. As shown in FIG. 14A, the burrs formed on the upper edge 28Ue are removed at a beginning of the first shot blasting process. FIG. 14B shows an end of the first shot blasting process 211. The acute angle edges are deformed in the shot direction. FIG. 14C shows an end of the second shot blasting process 212. The deformations of the acute angle edges are returned and further deformed in the shot direction. FIG. 14D shows the third and fourth shot blasting processes 213 and 222. The edges are trimmed into rounded shapes and are adjusted to permit the target flow rate.

FIGS. 15 and 16 show a fifth embodiment of the present invention. In this embodiment, an electrical-discharge machining process 100a is carried out instead of the pressing and grinding processes in the first embodiment. FIG. 15 is a cross sectional view showing an electrical-discharge machining process using a conical electrode 8. The process 100a penetrates the plate material 2, and forms no burrs on both of the upper and lower edges 28Ue and 28Le. Therefore, the penetrated plate material 2 is conveyed to the edge trimming process 200 without grinding.

FIGS. 16A, 16B, and 16D show an edge trimming process of the fifth embodiment. FIG. 16A shows an end of the first shot blasting process 211. The acute angle edges are deformed in the shot direction. FIG. 16B shows an end of the second shot blasting process 212. The deformations of the acute angle edges are returned and further deformed in the shot direction. FIG. 16C shows the third and fourth shot blasting processes 213 and 222. The edges are trimmed into rounded shapes and are adjusted to permit the target flow rate.

FIG. 17 shows variations of apertures on which the present invention is applicable. FIG. 17A shows a straight aperture that has an axis perpendicular to the plate material 2 and a uniform diameter along length thereof. The adjusting process 220 is effective to the straight aperture as shown in FIG. 17A. FIG. 17B shows a tapered aperture that has an axis perpendicular to the plate material 2 and increasing diameter along a flow direction of fuel. Either the deburring process 210 or the adjusting process 220 is effective to the tapered aperture as shown in FIG. 17B. FIG. 17C shows an inclined aperture that has an axis inclined with respect to the plate material 2. Either the deburring process 210 or the adjusting process 220 is effective to the inclined aperture as shown in FIG. 17C. FIG. 17D shows the aperture similar to the first embodiment that has an axis inclined with respect to the plate material 2 and has a tapered surface expanding along the flow direction of fuel. As described above, either the deburring process 210 or the adjusting process 220 is effective to the aperture as shown in FIG. 17D.

Figure 18:
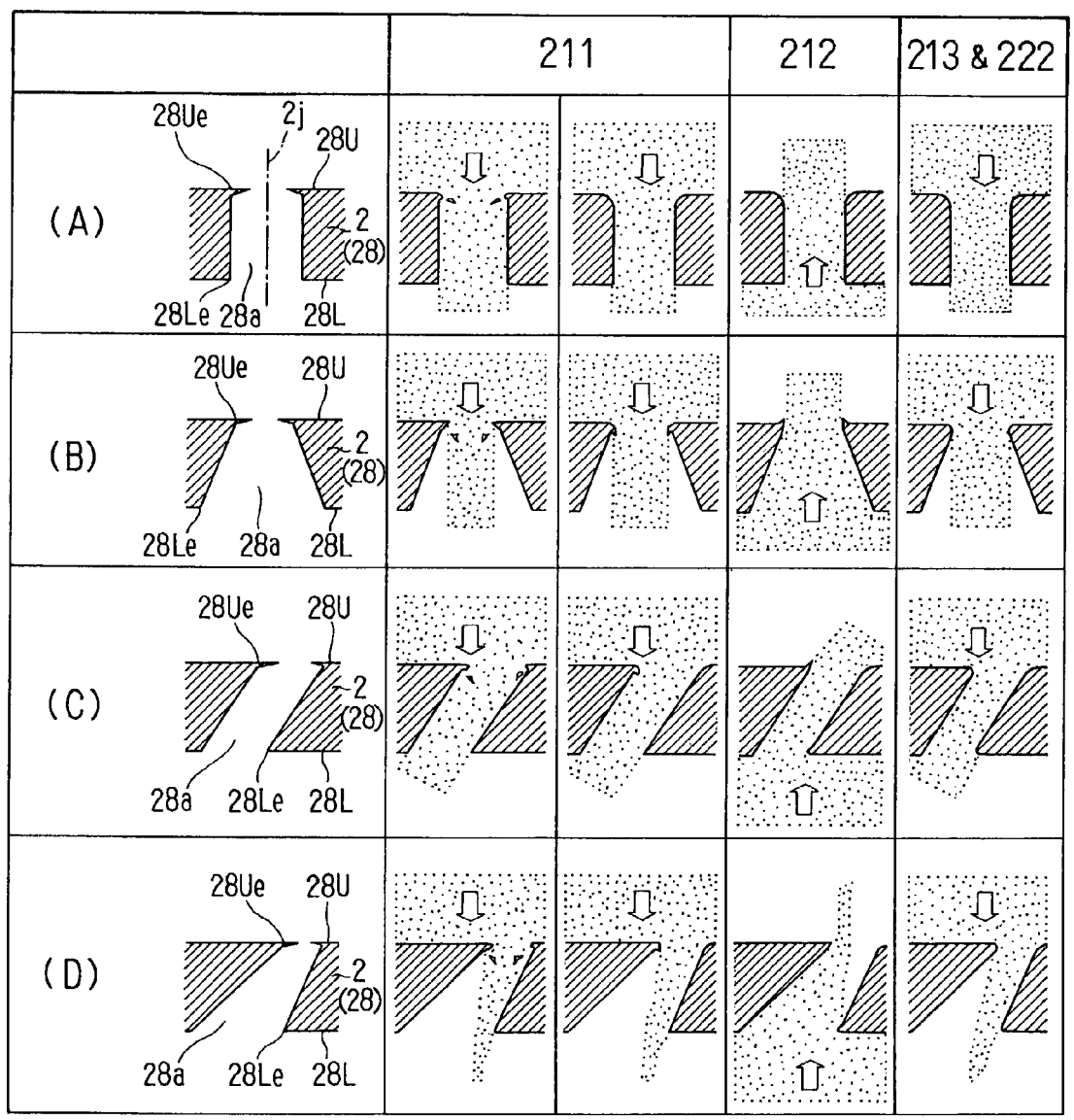
FIG. 18 is a chart showing cross sectional views of orifice members having different shaped apertures and showing progress of shot blasting process.

FIG. 18 shows cross sectional views of the apertures to show a progress of the shot blasting processes with respect to different shapes of the apertures. The apertures shown in the left row of FIG. 18 are machined by the pressing process 110 and the grinding process as described in the first embodiment. Therefore, the apertures only has the burrs on the upper edge 28Ue.

Referring to FIG. 18, the top line (A) shows a straight aperture that has an axis 2j perpendicular to the plate material 12 and a uniform diameter. In case of such the straight aperture, only the first shot blasting process 211 is sufficient to remove the burrs and trim the upper edge 28Ue. However, the following process 212 and 213 may be carried out to trim the lower edge 28Le. The shot blasting process 222 for adjusting the flow rate is effective to the straight aperture.

The second line (B) shows a tapered aperture. The third line (C) shows an inclined aperture. The fourth line (D) shows an inclined and tapered aperture that is the same as the first embodiment. In the first shot blasting process 211, both the acute angle edge on the upper edge 28Ue and the acute angle edge on the lower edge 28Le are processed by the abrasive particles. Similarly, in the second shot blasting process 212, both the acute angle edge on the lower edge 28Le and the acute angle edge on the upper edge 28Ue are processed by the abrasive particles. In case of the apertures illustrated in (A), (B) and (C), each of the shot blasting processes 211, 212, 213 and 222 works in the same manner as described in the first embodiment.

In the above embodiments, the adjusting process 220 including the measuring process 221 and the shot blasting process 222 is effective for the orifice member of which the burrs are removed by the other deburring process such as an electrolytic deburring process. Therefore, the deburring process 210 in the first embodiment may be replaced with the electrolytic deburring process. On the other hand, the deburring process including at least two shot blasting processes in opposite directions is effective for the orifice member that needs no adjusting process or is subject to the other adjusting process. Further, although, a dry type shot blast machine is used in the above embodiments, a wet type shot blast machine may be used. For instance, the wet type shot blast machine may be used for the deburring process including at least two shot blasting processes in opposite directions.

As described above, a processing amount of each of the shot blasting process may be adjusted by several conditions for processing. For example, the processing amount can be controlled by controlling a distance between the nozzle of the shot blast machine and the work, or a shooting pressure from the nozzle. However, it is difficult to obtain a proportional relationship or linear relationship between the processing amount and the distance, or between the processing amount and the shooting pressure, and requires laborious and complex control in order to achieve target flow rate or target shape. For example, the shot blasting process may become unstable when the shooting pressure is below 0.1 Mpa. For example, the processing amount can be controlled by a supplying rate of the abrasive particles. However, it is also difficult to obtain a linear control characteristic. In case of using sub-micron diameter abrasive particles for an aperture about 0.1 mm in diameter, the supply rate is difficult to control in stable. For example, the period of time for processing can be controlled by the valve for turning on and off pressurized air supply. However, a precision control, e.g., several hundreds of milliseconds or less, is difficult due to a delay. Further, in case of moving the nozzle, the nozzle may move quickly so as to transverse the plate material 2, and repeat it. In this case, the processing time can be adjusted by counting the number of repetition.

In the deburring process 210, the third shot blasting process 213 may be removed. Further, additional shot blasting process may be added before the first shot blasting process or after the third shot blasting process.

In the adjusting process 220, a plurality of shot blasting processes may be carried out. For example, the shot direction may be alternated during the adjusting process.

The orifice member 28 may be formed into a circular plate, and welded on the distal end of the valve body 29 or attached on the distal end of the valve body 29 with appropriate retainer or the like.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A method of manufacturing an injector nozzle, said method comprising:
   penetrating a plate material to form a nozzle aperture; and
   trimming the edge of the aperture with a shot blasting process,
   wherein the shot blasting process comprises at least two shot blasting processes having opposite shot directions with respect to the plate material.

2. A method of manufacturing an injector nozzle as in claim 1, wherein the shot directions of the shot blasting processes are inverted before the edge of the aperture is rolled.

3. A method of manufacturing an injector nozzle as in claim 2, wherein the shot blasting processes comprises:
   a first shot blasting process in a direction onto one of the surfaces of the plate material;
   a second shot blasting process in a direction onto the other one of the surfaces of the plate material after the first shot blasting process; and
   a third shot blasting process in the same direction as the first shot blasting process after the second shot blasting process.

4. A method of manufacturing an injector nozzle as in claim 3, wherein the first shot blasting process is directed onto an upper surface of the plate material with respect to a flow direction of fuel.

5. A method of manufacturing an injector nozzle as in claim 1, wherein the shot blasting process is executed for a period of time that is adjusted so that the edge of the aperture is trimmed in a predetermined radius.

6. A method of manufacturing an injector nozzle as in claim 1, further comprising adjusting a flow rate of the aperture, the adjusting step including:

measuring a flow rate of the aperture after the trimming step; and shot blasting the plate material with a processing condition that is determined in response to the measured flow rate.

7. A method of manufacturing an injector nozzle said method comprising:

penetrating a plate material to form an aperture;

trimming the edge of the aperture with a shot blasting process;

measuring a flow rate of the aperture, wherein a processing condition of the shot blasting process in the trimming step is controlled in response to to the measured flow rate;

wherein the processing condition of the shot blasting condition includes a period of time for shot blasting that is determined based on the measured flow rate and a target flow rate; and wherein the shot blasting process comprises a plurality of shot blasting processes, and at least one of the processing condition of the shot blasting process is controlled in response to the measured flow rate.

8. A method of manufacturing an injector nozzle as in claim 7, wherein the measured flow rate is reflected on a shot blasting on the plate material that has the aperture measured.

9. A method of manufacturing an injector nozzle as in claim 7, wherein the measured flow rate is reflected on a shot blasting on another plate material that has an aperture not yet measured.

10. A method of manufacturing an injector nozzle said method comprising:

penetrating a plate material to form an aperture;

trimming the edge of the aperture with a shot blasting process;

wherein the plate material is a belt shape that has a plurality of areas each corresponding to a orifice member having the aperture thereon, and wherein the plate material is conveyed in a longitudinal direction of the belt shape in a step-by-step manner so that the area is placed in each steps such as the penetrating step and the trimming step.

* * * * *